US012602123B2

(12) United States Patent
Nishizawa et al.

(10) Patent No.: US 12,602,123 B2
(45) Date of Patent: *Apr. 14, 2026

(54) ELECTRONIC PEN

(71) Applicant: Wacom Co., Ltd., Saitama (JP)

(72) Inventors: Naoya Nishizawa, Saitama (JP);
Tatsunori Kato, Saitama (JP); **Hiroaki
Shiokawa, Saitama (JP); Kentaro
Matsumoto**, Saitama (JP)

(73) Assignee: Wacom Co., Ltd., Saitama (JP)

( * ) Notice: Subject to any disclaimer, the term of this
patent is extended or adjusted under 35
U.S.C. 154(b) by 0 days.

This patent is subject to a terminal dis-
claimer.

(21) Appl. No.: 18/968,945

(22) Filed: Dec. 4, 2024

(65) Prior Publication Data

US 2025/0093982 A1      Mar. 20, 2025

Related U.S. Application Data

(63) Continuation of application No. 18/492,590, filed on
Oct. 23, 2023, now Pat. No. 12,182,346.

(30) Foreign Application Priority Data

Dec. 5, 2022      (JP) ................................. 2022-194174

(51) Int. Cl.
*G06F 3/039* (2013.01)
*G06F 3/0354* (2013.01)
*G06F 3/041* (2006.01)

(52) U.S. Cl.
CPC .......... *G06F 3/039* (2013.01); *G06F 3/03545*
(2013.01); *G06F 3/0414* (2013.01)

(58) Field of Classification Search
CPC .............. G02B 27/017; G02B 27/0176; G02B 2027/0187; G06F 3/011; G06F 3/0304;
G06F 3/0346; G06F 3/03542; G06F
3/03545; G06F 3/0386; G06F 3/0487;
G06F 3/017; G06F 3/038; G06F 3/0383;
G06F 2203/0384; A63F 13/825; B43K
29/00; B43K 29/08; G06N 20/00; G06T
1/00; G06V 40/20; G06V 40/33; G06V
10/82; G06V 30/142; G06V 30/32; G09B
11/00; A61B 5/11; A61B 2562/0219
See application file for complete search history.

(56) References Cited

U.S. PATENT DOCUMENTS

| | | | | |
|---|---|---|---|---|
| 10,222,879 | B2 * | 3/2019 | Trutna | ................... H01M 50/20 |
| 2009/0251442 | A1 | 10/2009 | Nakata | |
| 2020/0218367 | A1 | 7/2020 | Yang et al. | |
| 2021/0034175 | A1 | 2/2021 | Kang | |

FOREIGN PATENT DOCUMENTS

JP            5235472 B2      7/2013

* cited by examiner

*Primary Examiner* — Nelson M Rosario
(74) *Attorney, Agent, or Firm* — Seed Intellectual
Property Law Group LLP

(57) ABSTRACT

Provided is an electronic pen including an electronic pen
main body unit having a pen shape, and having a pen tip that,
in operation, performs a position indication, the pen tip
being formed in an end portion on a first end side of the
electronic pen main body unit in an axial direction of the
electronic pen main body unit, a weight member; and an
attachment portion that detachably attaches to the weight
member, the attachment portion being formed in an end
portion on a second end side of the electronic pen main body
unit in the axial direction of the electronic pen main body
unit.

4 Claims, 3 Drawing Sheets

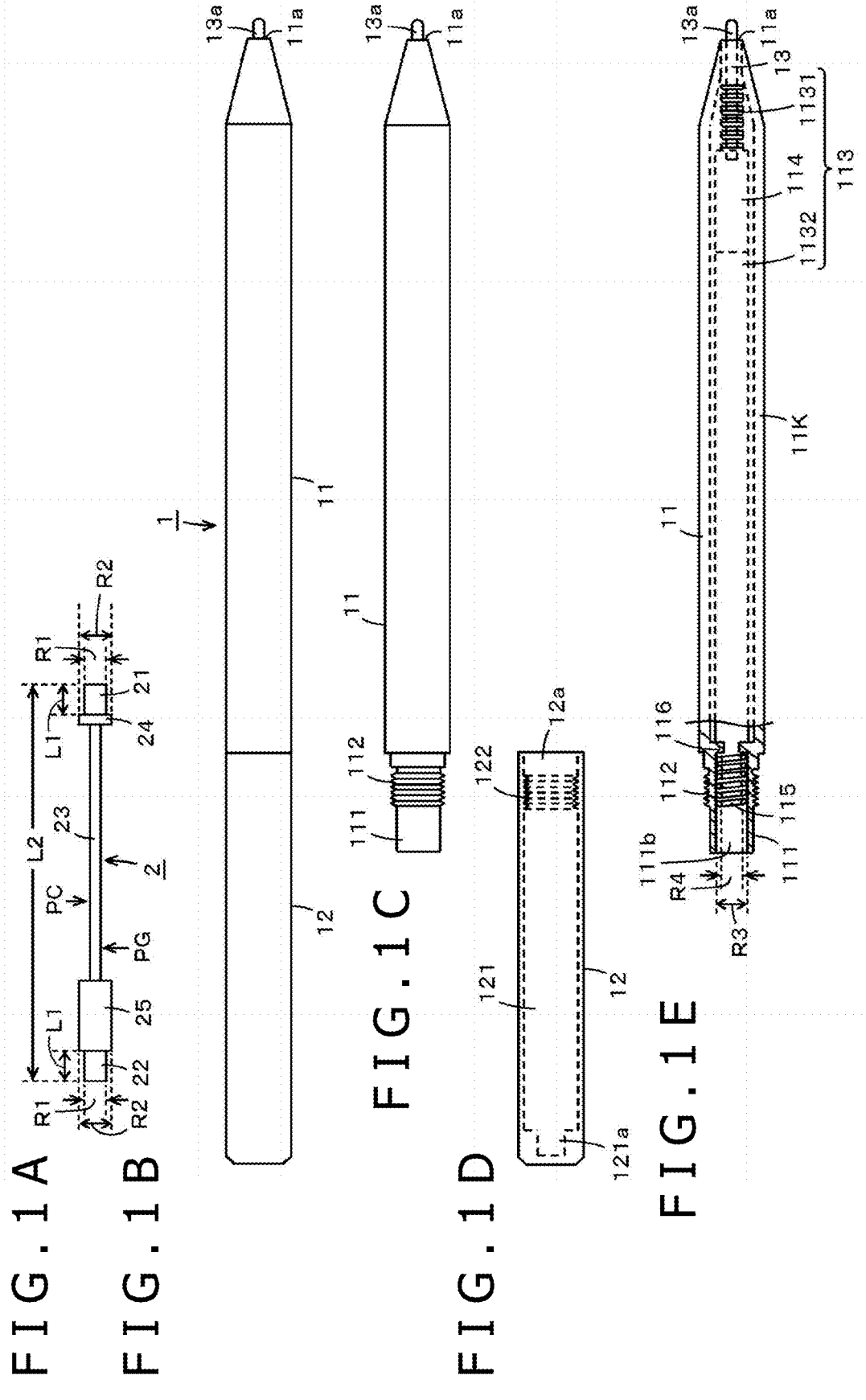

F I G . 3
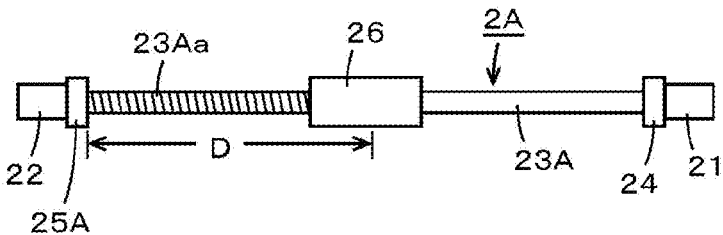
F I G . 4 A
F I G . 4 B
F I G . 4 C
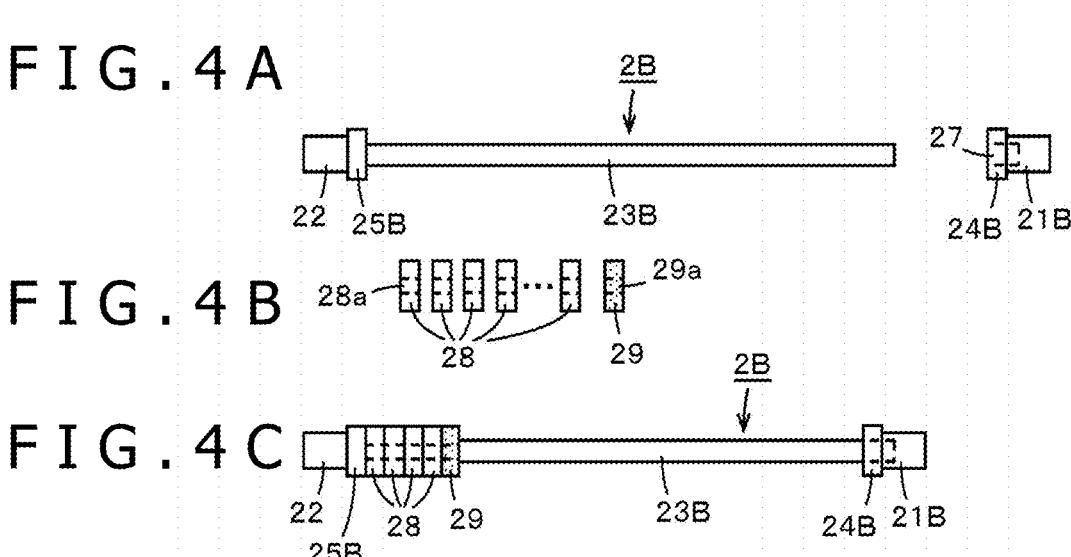

ELECTRONIC PEN

BACKGROUND

Technical Field

The present disclosure relates to an electronic pen.

Description of the Related Art

Recently, an electronic pen that can store a writing trace or a drawing trace as writing input data or drawing input data has been used with praise in place of writing instruments such as a pencil and a ballpoint pen for writing input of a writing trace or a drawing trace on a writing medium such as paper. The electronic pen is used in conjunction with a position detecting device. The position detecting device includes a position detecting sensor that detects an indicated position indicated by the electronic pen. The position detecting device generates writing input data or drawing input data as time series data concerning the indicated position indicated by the electronic pen and detected by the position detecting sensor.

As electronic apparatuses including the position detecting device, electronic apparatuses in various forms are provided, such as an electronic apparatus referred to as a pen tablet terminal device not having the function of a display device, a tablet type information processing terminal that includes a display screen and that is configured to allow a position indication input to be performed by the electronic pen on the display screen, and a recent Interactive White Board (IWB: electronic whiteboard).

A user of the electronic pen brings a pen tip of the electronic pen into contact with or close to an input surface provided in a manner corresponding to a detection region of the position detecting sensor included in these electronic apparatuses, and performs a writing input operation or a drawing input operation. In this case, as in a case of a writing instrument such as a pencil, a ballpoint pen, or a fountain pen, the user uses the electronic pen in a pen shape while gripping a part close to a pen tip side in the axial direction of the electronic pen with fingers of a hand.

Now, though differing for each type or application, each of the positions of an own weight and a center of gravity of an electronic pen of this kind is typically a determined and fixed position. However, there is a desire to adjust the positions of the own weight and the center of gravity of the electronic pen according to the length of a usage time for which the user uses the electronic pen and a difference in preference of the user (preference in an operation feeling when the user grips and operates the electronic pen). However, there is a problem in that the desire is difficult to meet when the positions of the own weight and the center of gravity of the electronic pen are fixed.

In order to solve this problem, there has been proposed an electronic pen which enables the positions of the own weight and the center of gravity of the electronic pen to be adjusted by providing a weight adjusting member in a part of the electronic pen in a pen shape which ranges from the vicinity of a position at which the user grips the electronic pen to a position on the pen tip side (see Japanese Patent No. 5235472).

Desires of the user of the electronic pen include not only the desire for the adjustment according to the length of the usage time and the preference of the user as described above but also a desire to make the pen tip side as light as possible, or, if possible, change the gravity center position of the electronic pen to a rear end side of a gripping portion gripped by the user in a case where a fine part is to be drawn in a drawing input, for example. In addition, at a time of a writing input or an ordinary drawing input, the user uses the electronic pen while gripping a part close to the pen tip side with fingers of a hand, as described above. However, in a case of a drawing input such as filling in a background or the like, as in gripping the rear end side of a paintbrush, the user moves the position at which the user grips the electronic pen to a rear end side, and operates the electronic pen while lightly gripping the electronic pen. In that case, better usability is provided when the gravity center position of the electronic pen is on the rear end side rather than on the pen tip side.

Further, in a case where presentation or the like is performed with use of the IWB, for example, the electronic pen is used as a position indicating tool on the IWB, and a character or a figure that is input by writing or input by drawing is relatively large. Hence, there is a desire for the user to perform an operation such that the pen tip side is made light while the user grips the rear end side in the axial direction of the electronic pen.

However, in the disclosure disclosed in Japanese Patent No. 5235472, the weight adjusting member is provided in the part ranging from the vicinity of the position at which the user grips the electronic pen to a position on the pen tip side in the axial direction of an electronic pen main body unit of the electronic pen. Thus, the disclosure disclosed in Japanese Patent No. 5235472 only enables adjustment of the weight and the gravity center position in a part ranging from a central portion in the axial direction of the electronic pen to the pen tip. Hence, an adjustment range is narrow, and it is difficult to make such an adjustment as to make the pen tip side light by moving the gravity center position to the rear end side, which is a side opposite from the pen tip side of the electronic pen, as described above.

BRIEF SUMMARY

It is an object of the present disclosure to provide an electronic pen that can solve the above problems.

In order to solve the above problems, there is provided an electronic pen including an electronic pen main body unit having a pen shape, and having a pen tip that, in operation, a position indication, the pen tip being formed in an end portion on one end side of the electronic pen main body unit in an axial direction of the electronic pen main body unit, a weight member, and an attachment portion that detachably attaches to the weight member, the attachment portion being formed in an end portion on a second end side of the electronic pen main body unit in the axial direction of the electronic pen main body unit.

According to the electronic pen having the above-described configuration, the weight member can be detachably attached to the attachment portion in the end portion on the other end side in the axial direction of the electronic pen main body unit. Hence, when a user of the electronic pen desires to make the pen tip side light by moving a center of gravity to the rear end side of the electronic pen, the user can easily realize this by attaching the weight member to the attachment portion, and this is very convenient.

BRIEF DESCRIPTION OF THE SEVERAL VIEWS OF THE DRAWINGS

FIGS. 1A, 1B, 1C, 1D, and 1E are diagrams of assistance in explaining an example of a configuration of an embodiment of an electronic pen according to the present disclosure;

FIG. 3 is a diagram illustrating another example of the weight member in the embodiment of the electronic pen according to the present disclosure; and FIGS. 4A, 4B, and 4C are diagrams illustrating another example of the weight member in the embodiment of the electronic pen according to the present disclosure.

DETAILED DESCRIPTION

Figures 2A, 2B, 2C, 2D:
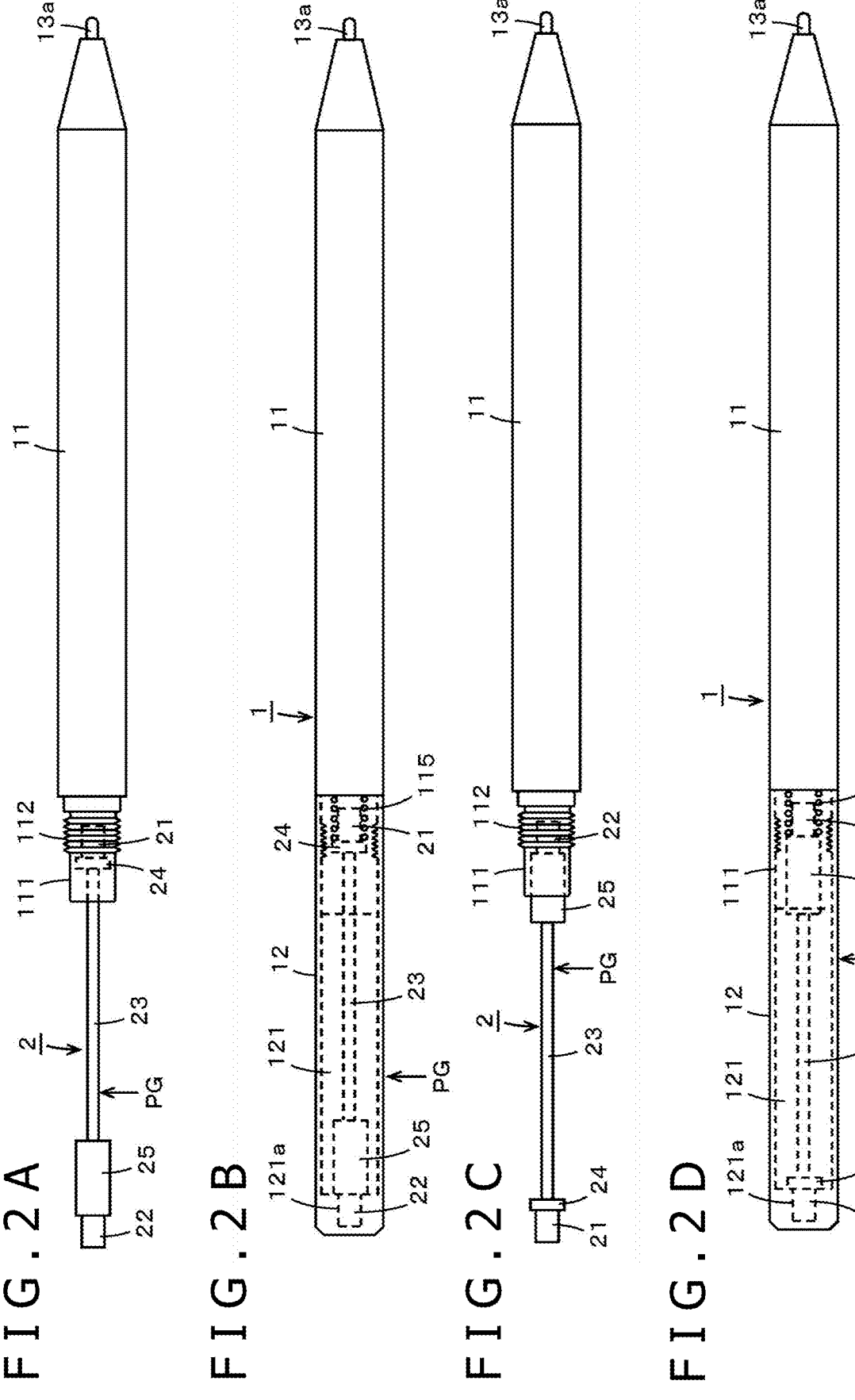
FIGS. 2A, 2B, 2C, and 2D are diagrams illustrating states in which a weight member is attached in the embodiment of the electronic pen according to the present disclosure.

In the following, an embodiment of an electronic pen according to the present disclosure will be described with reference to the drawings. FIGS. 1A to 1E are diagrams of assistance in explaining an example of a configuration of an electronic pen 1 according to the present embodiment. FIG. 1B illustrates an external appearance of the electronic pen 1 according to the present embodiment. The electronic pen 1 has a weight member 2 as illustrated in FIG. 1A as an accessory.

As illustrated in FIG. 1B, the electronic pen 1 according to the present embodiment has an elongate pen shape in a cylindrical form in the present example, and one end side in the axial direction of the pen shape is a pen tip side. Moreover, as illustrated in FIGS. 1B to 1D, the electronic pen 1 according to the present embodiment includes an electronic pen main body unit 11 having a pen shape on the pen tip side in the axial direction and a cap case unit 12 on a rear end side that is a side opposite from the pen tip side in the axial direction. In the present example, the electronic pen 1 is formed by putting the cap case unit 12 illustrated in FIG. 1D on the rear end side of the electronic pen main body unit 11 illustrated in FIG. 1C, and coupling the cap case unit 12 to the rear end side of the electronic pen main body unit 11.

Moreover, in the present embodiment, as illustrated in FIG. 1D, the cap case unit 12 has an opening 12*a* on a pen tip side thereof that is to be put on the electronic pen main body unit 11, and the cap case unit 12 has a rear end side thereof closed, so that the cap case unit 12 has a structure including a space portion 121 therewithin. In addition, as illustrated in FIG. 1C, the rear end side of the electronic pen main body unit 11 is provided with a cap case unit engaging portion (hereinafter abbreviated as an engaging portion) 111 to be inserted into the internal space portion 121 of the cap case unit 12.

In the present example, as illustrated in FIG. 1C and FIG. 1E, a threaded portion 112 is formed on the engaging portion 111 of the electronic pen main body unit 11. In addition, as illustrated in FIG. 1D, a threaded portion 122 to be screwed onto the threaded portion 112 is provided at a position of an inner wall surface of the internal space portion 121 of the cap case unit 12 which corresponds to the threaded portion 112 when the engaging portion 111 is inserted.

When the cap case unit 12 is put on the rear end side of the electronic pen main body unit 11 and screwed onto the rear end side of the electronic pen main body unit 11 in such a manner as to house the engaging portion 111, the threaded portion 122 of the cap case unit 12 is screwed onto the threaded portion 112 of the engaging portion 111, so that the cap case unit 12 is locked and attached to the rear end side of the electronic pen main body unit 11. The cap case unit 12 can be detached from the electronic pen main body unit 11 by cancelling the screw engagement between the threaded portion 122 and the threaded portion 112 of the engaging portion 111. That is, the cap case unit 12 is detachable from the electronic pen main body unit 11.

FIG. 1E is a view illustrating the electronic pen main body unit 11, with the rear end side thereof illustrated in section. As illustrated in FIG. 1E, an interaction unit 113 that performs signal interaction with a position detecting sensor is provided within a hollow portion of an elongate cylindrical pen casing 11K of the electronic pen main body unit 11.

As illustrated in FIGS. 1B, 1C, and 1E, the pen casing 11K of the electronic pen main body unit 11 has one end side in the axial direction thereof as a pen tip side, and has a taper shape that tapers off gradually. Moreover, an end on the pen tip side of the pen casing 11K of the electronic pen main body unit 11 has an opening 11*a* (see FIG. 1E), and a tip end portion 13*a* of a core body 13 is protruded from the opening 11*a*. In addition, a rear end side of the pen casing 11K of the electronic pen main body unit 11 is formed as the engaging portion 111 described above.

The electronic pen 1 in the present example is of an electromagnetic induction type. The interaction unit 113 within the electronic pen main body unit 11 of the electronic pen 1 includes a coil member 1131 in which a coil is wound around a magnetic core, for example, a ferrite core, and a circuit board 1132 mounted with a circuit including a capacitor connected to the coil of the coil member 1131 to form a resonance circuit.

Though not illustrated in the figures, the circuit board 1132 constituting the interaction unit 113 is held in a holder in a boat-like shape. A pen pressure detecting portion 114 is provided in a part on a pen tip side of the holder. Moreover, the coil member 1131 is coupled and attached to a further pen tip side of the part of the holder which holds the pen pressure detecting portion 114. The interaction unit 113 thus forms a modular part. The interaction unit 113 formed as a modular part is housed within the hollow portion of the pen casing 11K of the electronic pen main body unit 11 in a state in which the interaction unit 113 does not move in the axial direction. Moreover, the core body 13 is fitted and attached to a fitting portion of the pen pressure detecting portion 114 through a through hole provided in the ferrite core constituting the coil member 1131. The core body 13 is detachable from the fitting portion of the pen pressure detecting portion 114.

As illustrated in FIG. 1E, the engaging portion 111 in a rear end portion of the electronic pen main body unit 11 of the electronic pen 1 according to the present embodiment has an opening 111*b* made to communicate with a hollow space within the engaging portion 111, and is configured to play a role of an attachment portion for the weight member 2.

The weight member 2 in the present example is formed of metal. It is needless to say that the material of the weight member 2 is not limited to metal. As illustrated in FIG. 1A, the weight member 2 in the present example has a configuration of a rod-shaped member, and a fitting portion 21 and a fitting portion 22 to be fitted in the engaging portion 111 constituting the attachment portion, as will be described later, is formed at both one end and another end in the axial direction of the rod-shaped member. The fitting portion 21 and the fitting portion 22 both have a cylindrical shape with a length L1 in the axial direction and a diameter R1 in the present example.

Moreover, in the present example, as illustrated in FIG. 1A, the fitting portion 21 and the fitting portion 22 are connected via a flange portion 24 and a flange portion 25, respectively, to an elongate connecting rod portion 23 having a diameter smaller than the diameter R1 of the fitting portion 21 and the fitting portion 22. The flange portion 24 and the flange portion 25 both have a cylindrical shape with a diameter R2 larger than the diameter R1. However, in the present example, as illustrated in FIG. 1A, the flange portion 24 and the flange portion 25 have different lengths in the axial direction. In the example of FIG. 1A, the length in the axial direction of the flange portion 25 is several times the length in the axial direction of the flange portion 24. Thus, as illustrated in FIG. 1A, a gravity center position PG of the weight member 2 is at a position shifted to the flange portion 25 side from a central position Pc in the axial direction of the whole of the weight member 2.

On the other hand, a diameter R3 of the opening (opening of the case 11K) 111$b$ of the engaging portion 111 on the rear end side of the electronic pen main body unit 11 which constitutes the attachment portion for the weight member 2 is selected to be slightly larger than the diameter R2 of the flange portions 24 and 25 of the weight member 2. Thus, the weight member 2, including not only the fitting portion 21 and the fitting portion 22 but also the flange portion 24 and the flange portion 25, can be inserted into the hollow space from the opening 111$b$ of the engaging portion 111. When the fitting portion 21 side or the fitting portion 22 side of the weight member 2 is inserted into the engaging portion 111 of the electronic pen main body unit 11, most of the weight member 2 as a rod-shaped member projects outward from the engaging portion 111 of the electronic pen main body unit 11 and extends in the axial direction.

The internal space portion 121 of the cap case unit 12 has such a size as to be able to house the weight member 2 without the weight member 2 rattling in the axial direction within the internal space portion 121, coupled with the elasticity of a coil spring 115 as an elastic member to be described later, the weight member 2 projecting outward from the engaging portion 111 of the electronic pen main body unit 11 and extending in the axial direction. As illustrated in FIG. 1D, in the present embodiment, a recessed portion 121$a$ for housing the fitting portion 21 or 22 of the weight member 2 is formed on the rear end side of the internal space portion 121 of the cap case unit 12.

Moreover, in the present embodiment, as illustrated in FIG. 1E, an elastic member, or the coil spring 115 in the present example, is housed within the hollow space communicating with the opening 111$b$ of the engaging portion 111 constituting the attachment portion for the weight member 2, such that a direction in which the coil spring 115 elastically expands or contracts is the axial direction. An inside diameter R4 of the coil spring 115 is selected to be slightly larger than the diameter R1 of the fitting portions 21 and 22 of the weight member 2. An outside diameter R5 (not illustrated) of the coil spring 115 is selected to be slightly smaller than the diameter R3 of the opening 111$b$.

That is, in the present embodiment, the relation between the diameter R1 of the fitting portions 21 and 22 of the weight member 2, the diameter R2 of the flange portion 24 and the flange portion 25, the diameter R3 of the opening 111$b$ of the engaging portion 111 of the electronic pen main body unit 11, and the inside diameter R4 and the outside diameter R5 of the coil spring 115 is R1<R4<R5<R3, and is R4<R2<R3.

In this case, in the electronic pen main body unit 11 according to the present embodiment, a ring-shaped protruding portion 116 having a through hole with an inside diameter smaller than the outside diameter R5 of the coil spring 115 is formed at a predetermined position on an inner wall of a hollow portion of the engaging portion 111. Thus, one end of the coil spring 115 which is on the pen tip side in the direction in which the coil spring 115 elastically expands or contracts abuts against the ring-shaped protruding portion 116, and the coil spring 115 is inhibited from moving to the pen tip side any further. Moreover, in the present embodiment, the one end on the pen tip side in the direction in which the coil spring 115 elastically expands or contracts is fixed to the ring-shaped protruding portion 116 by an adhesive or the like. Incidentally, instead of the ring-shaped protruding portion 116, a member for inhibiting the coil spring 115 from moving in the axial direction at the predetermined position on the inner wall of the hollow portion of the engaging portion 111 may be a plurality of protrusions or a partition wall that divides a hollow space portion and a space portion on the pen tip side from each other.

As described above, in the electronic pen 1 according to the present embodiment, the engaging portion 111 on the rear end side of the electronic pen main body unit 11 which is for engagement with the cap case unit 12 is configured as the attachment portion for the weight member 2, and is configured such that the weight member 2 can be detachably attached to the engaging portion 111. Hence, when a user of the electronic pen 1 desires to make the pen tip side of the electronic pen 1 lighter by moving a center of gravity to the rear end side of the electronic pen 1, the user can easily realize this by attaching the weight member 2 to the engaging portion 111 of the electronic pen main body unit 11 as the attachment portion.

Moreover, in the electronic pen 1 according to the present embodiment, the weight member 2 has the configuration of the rod-shaped member, the weight member 2 includes the fitting portion 21 and the fitting portion 22 to be fitted to the engaging portion 111 at one end portion and another end portion in the axial direction of the weight member 2, and the weight member 2 is configured such that the gravity center position in the axial direction of the weight member 2 is made different between a case where the fitting portion 21 is fitted to the engaging portion 111 and a case where the fitting portion 22 is fitted to the engaging portion 111. Hence, when the user of the electronic pen 1 moves the center of gravity to the rear end side of the electronic pen 1 by the weight member 2, the user can select two gravity center positions, which is convenient.

FIGS. 2A to 2D represent diagrams illustrating states in which the weight member 2 is attached to the engaging portion 111 constituting the attachment portion on the rear end side of the electronic pen main body unit 11. FIG. 2A is a diagram illustrating a state in which the fitting portion 21 of the weight member 2 is inserted into the hollow space of the engaging portion 111 on the rear end side of the electronic pen main body unit 11. FIG. 2B is a diagram illustrating a state in which the cap case unit 12 is put and screwed onto the electronic pen main body unit 11 fitted with the weight member 2 as in FIG. 2A.

In addition, FIG. 2C is a diagram illustrating a state in which the fitting portion 22 of the weight member 2 is inserted into the hollow space of the engaging portion 111 on the rear end side of the electronic pen main body unit 11. FIG. 2D is a diagram illustrating a state in which the cap case unit 12 is put and screwed onto the electronic pen main body unit 11 fitted with the weight member 2 as in FIG. 2C.

As illustrated in FIG. 2A and FIG. 2C, when the fitting portion 21 or the fitting portion 22 of the weight member 2 is inserted into the hollow portion of the engaging portion 111 of the electronic pen main body unit 11, the fitting portion 21 or the fitting portion 22 of the weight member 2 is inserted and fitted into a space of the inside diameter R4 of the coil spring 115 within the hollow portion of the engaging portion 111 since the diameter R1 of the fitting portion 21 and the fitting portion 22 is smaller than the inside diameter R4 of the coil spring 115. Moreover, because the diameter R2 of the flange portion 24 and the flange portion 25 of the weight member 2 is larger than the inside diameter R4 of the coil spring 115, a stepped portion between the fitting portion 21 and the flange portion 24 of the weight member 2 or a stepped portion between the fitting portion 22 and the flange portion 25 abuts against an end portion on the rear end side of the coil spring 115. Thus, the weight member 2 is always biased by the coil spring 115 to another end side in the axial direction with respect to the electronic pen main body unit 11.

Then, when the cap case unit 12 is screwed onto the engaging portion 111 on the rear end side of the electronic pen main body unit 11, the states illustrated in FIG. 2A and FIG. 2C are changed to states illustrated in FIG. 2B and FIG. 2D. That is, in the case of FIG. 2B, the fitting portion 21 of the weight member 2 attached to the engaging portion 111 of the electronic pen main body unit 11 is housed within the space of the inside diameter R4 of the coil spring 115, the fitting portion 22 of the weight member 2 is housed within the recessed portion 121*a* of the internal space portion 121 of the cap case unit 12, and the weight member 2 is regulated by the elasticity of the coil spring 115 in such a manner as not to move in the axial direction within the internal space portion 121 of the cap case unit 12. Similarly, in the case of FIG. 2D, the fitting portion 22 of the weight member 2 is housed (fitted) within the space of the inside diameter R4 of the coil spring 115, the fitting portion 21 is housed within the recessed portion 121*a* of the internal space portion 121 of the cap case unit 12, and the weight member 2 is regulated by the elasticity of the coil spring 115 in such a manner as not to move in the axial direction within the internal space portion 121 of the cap case unit 12.

As illustrated in FIG. 2B and FIG. 2D, an overall length L2 (see FIG. 1A) in the axial direction of the weight member 2 is set to such a length that, when the cap case unit 12 is screwed onto and coupled to the electronic pen main body unit 11, the fitting portion 21 or the fitting portion 22 is included in the recessed portion 121*a* of the internal space portion 121 of the cap case unit 12 and the weight member 2 presses and elastically contracts the coil spring 115.

The gravity center position PG of the weight member 2 is a position shifted closer to the fitting portion 22 side from a central position in the axial direction of the weight member 2. Hence, as illustrated in FIG. 2B and FIG. 2D, the gravity center position PG of the weight member 2 differs in the axial direction of the electronic pen 1 between a case where the fitting portion 21 of the weight member 2 is fitted to the engaging portion 111 of the electronic pen main body unit 11 and a case where the fitting portion 22 of the weight member 2 is fitted to the engaging portion 111 of the electronic pen main body unit 11. Thus, the gravity center position in the axial direction of the electronic pen 1 or the electronic pen main body unit 11 can also be made to differ between the case where the fitting portion 21 of the weight member 2 is fitted to the engaging portion 111 of the electronic pen main body unit 11 and the case where the fitting portion 22 of the weight member 2 is fitted to the engaging portion 111 of the electronic pen main body unit 11. The user can select which of the states is to be set, which is convenient.

Further, when the cap case unit 12 is removed from the electronic pen main body unit 11 from the state illustrated in FIG. 2B or FIG. 2D, the weight member 2 is exposed, and the fitting portion 21 or the fitting portion 22 is housed in a state of being fitted loosely in the space portion of the inside diameter of the coil spring 115. The weight member 2 can thus be extracted from the engaging portion 111 easily.

As described above, in the electronic pen 1 according to the present embodiment, the weight member 2 can easily be attached and detached to and from the electronic pen main body unit 11, and the gravity center position on the rear end side can be selected in two ways by selecting which side of the fitting portion 21 and the fitting portion 22 is to be fitted to the electronic pen main body unit 11. This is hence convenient. In addition, in the present embodiment, the coil spring 115 as an example of the elastic member provided in the engaging portion 111 (attachment portion) can inhibit the weight member 2 from moving in the axial direction within the internal space portion 121 of the cap case unit 12. Good usability is thus provided.

Further, in the electronic pen 1 according to the foregoing embodiment, the coil spring 115 as an example of the elastic member provided within the engaging portion 111 of the electronic pen main body unit 11 plays a role of a fitting recessed portion into which the fitting portion 21 or the fitting portion 22 of the weight member 2 is to be inserted and fitted. Thus, a recessed portion to be fitted with the fitting portion 21 or the fitting portion 22 does not need to be additionally formed separately from the coil spring 115. Moreover, the recessed portion 121*a* in which the fitting portion 21 or the fitting portion 22 is to be housed is formed on the rear end side of the internal space portion 121 of the cap case unit 12. Consequently, not only is the weight member 2 immobile in the axial direction but also the weight member 2 barely moves in a direction intersecting the axial direction. An effect is therefore provided in that the weight member 2 barely rattles within the internal space portion 121 of the cap case unit 12.

Modifications of Foregoing Embodiment

In the electronic pen 1 according to the foregoing embodiment, a configuration in which the cap case unit 12 is screwed onto the electronic pen main body unit 11 is adopted as a configuration that renders the cap case unit 12 detachable from the electronic pen main body unit 11. However, the electronic pen 1 according to the foregoing embodiment is not limited to such a configuration. For example, there may be adopted a configuration in which the cap case unit 12 is press-fitted to the electronic pen main body unit 11 rather than being screwed onto the electronic pen main body unit 11. In that case, a ridge or a recessed groove in a ring shape may be provided to a peripheral portion of the engaging portion 111 of the electronic pen main body unit 11, and a recessed groove or a ridge in a ring shape which is to be engaged with the ring-shaped ridge or the ring-shaped recessed groove of the engaging portion 111 may be provided to the inner wall surface of the internal space portion 121 of the cap case unit 12, so that coupling between the electronic pen main body unit 11 and the cap case unit 12 can be performed in a clicking manner.

In addition, the elastic member provided to the attachment portion of the electronic pen main body unit 11 is not limited to the coil spring 115 as described above, and a leaf spring or a cushion member can be used. In short, anything may be used as long as it can regulate movement in the axial direction of the weight member 2 and thereby inhibit the weight member 2 from rattling.

In addition, it is needless to say that the weight member is not limited to the weight member 2 having the configuration as described above. FIG. 3 and FIGS. 4A to 4C illustrate modifications of the weight member. The weight members in examples to be described in the following are also formed of metal. However, the material of the weight members may be any material.

In a weight member 2A in the example of FIG. 3, parts identical to those of the weight member 2 described above are identified by the same reference signs, and description thereof will be omitted. In the weight member 2A in the present example, the length in the axial direction of a flange portion 25A connected to the fitting portion 22 is set to be the same as the length in the axial direction of the flange portion 24 connected to the fitting portion 21, and the weights of both ends in the axial direction are set to be the same.

The weight member 2A in the present example has a threaded portion 23Aa formed in a range of substantially the half on the flange portion 25A side in the axial direction on a connecting rod portion 23A between the flange portion 24 and the flange portion 25A. Moreover, a moving member 26 that screws onto the threaded portion 23Aa is attached to the threaded portion 23Aa of the connecting rod portion 23A. The moving member 26 can be moved in the axial direction of the connecting rod portion 23A by being rotated on the threaded portion 23Aa of the connecting rod portion 23A. In the present example, as illustrated in FIG. 3, the moving member 26 can be moved in the axial direction within a range of a half length D on the flange portion 25A side in the axial direction of the connecting rod portion 23A.

As with the weight member 2 described above, the weight member 2A in the present example can also be used in a state of being inserted in the engaging portion 111 of the electronic pen main body unit 11 with use of both sides, that is, the fitting portion 21 side and the fitting portion 22 side. Moreover, in that case, when the fitting portion 21 side has been inserted into the engaging portion 111 of the electronic pen main body unit 11, the moving member 26 can be adjusted to any position in a half region on the rear end side of the connecting rod portion 23A by adjusting the position of the moving member 26 in the range of the length D of the connecting rod portion 23A. That is, the position of the moving member 26, or the gravity center position of the weight member 2A, can be adjusted to any position in a half region on the rear end side of the connecting rod portion 23A. In addition, when the fitting portion 22 side has been inserted into the engaging portion 111 of the electronic pen main body unit 11, the moving member 26 can be adjusted to any position in a half region on the pen tip side of the connecting rod portion 23A of the weight member 2A by adjusting the position of the moving member 26 in the range of the length D of the connecting rod portion 23A. That is, the position of the moving member 26, or the gravity center position of the weight member 2A, can be adjusted to any position in the half region on the pen tip side of the connecting rod portion 23A.

Accordingly, by using the weight member 2A in the present example, selecting which of the fitting portion 21 side and the fitting portion 22 side is to be inserted into the engaging portion 111 of the electronic pen main body unit 11, and adjusting the position of the moving member 26 in the range of the length D, it is possible to adjust the gravity center position of the weight member 2A to any position in the axial direction of the connecting rod portion 23A, and make a fine adjustment of the gravity center position of the electronic pen 1 or the electronic pen main body unit 11.

Incidentally, in the present example, as with the weight member 2, the weight member 2A is provided with the fitting portions 21 and 22 at both ends in the axial direction, and is configured such that each of the fitting portions 21 and 22 can be inserted into and attached to the engaging portion 111 of the electronic pen main body unit 11. However, a fitting portion may be provided on only one end side in the axial direction. In that case, the threaded portion 23Aa is provided to the whole of the connecting rod portion 23A, and the moving member 26 is configured to be movable over the whole in the axial direction of the connecting rod portion 23A.

Next, also in a weight member 2B in the example of FIGS. 4A to 4C, parts identical to those of the weight member 2 described above are identified by the same reference signs, and description thereof will be omitted. In the weight member 2B in the present example, as illustrated in FIG. 4A, a fitting portion 21B and a flange portion 24B on the one end side of the axial direction are provided with a recessed portion 27 to be press-fitted with one end side in the axial direction of a connecting rod portion 23B, and the fitting portion 21B and the flange portion 24B are detachable from the connecting rod portion 23B. Moreover, also in the weight member 2B in the present example, the length in the axial direction of a flange portion 25B connected to the fitting portion 22 is set to be the same as the length in the axial direction of the flange portion 24B connected to the fitting portion 21B, and the weights of both ends in the axial direction are set to be the same.

Moreover, the weight member 2B in the present example is accompanied with a plurality of weight pieces 28 for adjustment of an own weight and a gravity center position and a stopper 29 as accessories. The weight pieces 28 are formed in a circular ring shape having a through hole 28a with a diameter slightly larger than the diameter of the connecting rod portion 23B. The stopper 29 is a ring-shaped part having substantially the same shape as the weight pieces 28. However, the stopper 29 is formed of an elastic material, for example, an elastic rubber, and the diameter of a through hole 29a of the stopper 29 is set to be slightly smaller than the diameter of the connecting rod portion 23B.

The user of the weight member 2B selects the number of weight pieces 28 to be attached such that the weight member 2B has a desired own weight and a desired gravity center position. Then, the fitting portion 21B and the flange portion 24B are removed from the connecting rod portion 23B, and each of the selected number of weight pieces 28 is attached from an end portion side from which the fitting portion 21B and the flange portion 24B are removed, such that the connecting rod portion 23B is passed in the through hole 28a. Thereafter, as illustrated in FIG. 4C, the stopper 29 is press-fitted and attached to the connecting rod portion 23B to perform position regulation such that the plurality of weight pieces 28 attached to the connecting rod portion 23B do not move in the axial direction of the connecting rod portion 23B. Incidentally, in the present example, the number of weight pieces 28 that fill an entire length in the axial direction of the connecting rod portion 23B are prepared, and the number to be used are selected from among the weight pieces 28.

As with the weight members 2 and 2A described above, the weight member 2B in the present example can also be used in a state of being inserted in the engaging portion 111 of the electronic pen main body unit 11 with use of both sides, that is, the fitting portion 21B side and a fitting portion 22B side. Moreover, in that case, when the fitting portion 21B side has been inserted into the engaging portion 111 of the electronic pen main body unit 11, it is possible to adjust the own weight of the weight member 2B and adjust the gravity center position of the weight member 2B to any position in a half region on the rear end side of the connecting rod portion 23B by adjusting the number of weight pieces 28. In addition, when the fitting portion 22B side has been inserted into the engaging portion 111 of the electronic pen main body unit 11, it is possible to adjust the own weight of the weight member 2B and adjust the gravity center position of the weight member 2B to any position in a half region on the pen tip side of the connecting rod portion 23B by adjusting the number of weight pieces 28.

Hence, by using the weight member 2B in the present example, selecting which of the fitting portion 21 side and the fitting portion 22 side is to be inserted into the engaging portion 111 of the electronic pen main body unit 11, and adjusting the number of weight pieces 28, it is possible to adjust the own weight of the weight member 2B, adjust the gravity center position to any position in the axial direction of the connecting rod portion 23B, and make a fine adjustment of the gravity center position of the electronic pen 1 or the electronic pen main body unit 11.

Incidentally, in the weight member 2B in the example of FIGS. 4A to 4C, the weight pieces 28 are attached to one side so as to be pressed against the flange portion 25B of another end portion in the axial direction of the connecting rod portion 23B. However, two stoppers 29 can be used, and configured such that the two stoppers sandwich one or a plurality of weight pieces 28, and lock the one or plurality of weight pieces 28 at any position of the connecting rod portion 23B. In that case, the weight member may be configured such that a fitting portion is provided on only one end side in the axial direction.

In addition, also in the weight member 2B in the example of FIGS. 4A to 4C, a fitting portion may be provided to only one end portion in the axial direction.

Other Embodiments or Modifications

Incidentally, in the foregoing embodiment, the coil spring as an example of the elastic member is provided to the engaging portion constituting the attachment portion on the rear end side of the electronic pen main body unit, and the cap case unit is engaged with the engaging portion. The weight member is thereby configured to be inhibited from moving in the axial direction by the cap case unit and the coil spring. However, such a configuration is not essential. For example, a threaded portion may be provided within the engaging portion as an example of the attachment portion on the rear end side of the electronic pen main body unit, a threaded portion may be formed on a fitting portion(s) of the weight member, and the weight member may be attached by being screwed into the engaging portion. In that case, the elastic member is not necessary, and it suffices for the cap case unit to include a space portion that can house the weight member.

In addition, while the electronic pen includes the electronic pen main body unit and the cap case unit in the foregoing embodiment, the electronic pen may include by only the electronic pen main body unit. In that case, the weight member can be configured to be, for example, attached to the attachment portion on the rear end side of the electronic pen main body unit by a screwing method. In this case, the electronic pen is used in a state in which the weight member remains exposed. Incidentally, in this case, it suffices to attach a detachable lid portion to the rear end side of the electronic pen main body unit when the weight member is not attached.

In addition, while the weight member is a rod-shaped member in the foregoing example, it is needless to say that the weight member is not limited to a rod-shaped member. Weight members of various shapes can be used particularly in cases where the electronic pen does not include the cap case unit but only the electronic pen main body unit and the weight member is used in an exposed state.

It is to be noted that while the electronic pen in the foregoing example has been described as the configuration of an electronic pen using an electromagnetic induction system as a system for interaction with the position detecting sensor, the electronic pen according to the present disclosure can be applied to various electronic pens irrespective of the system for interaction with the position detecting sensor.

It is to be noted that the embodiment of the present disclosure is not limited to the foregoing embodiment, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An electronic pen comprising:
an electronic pen main body unit having a pen shape, and having a pen tip that, in operation, performs a position indication, the pen tip being formed in an end portion on a first end side of the electronic pen main body unit in an axial direction of the electronic pen main body unit;
a weight member;
an attachment portion that detachably attaches to the weight member, the attachment portion being formed in an end portion on a second end side of the electronic pen main body unit in the axial direction of the electronic pen main body unit; and
a cap case unit configured to be detachably engaged with the second end side of the electronic pen main body unit in the axial direction of the electronic pen main body unit such that the cap case unit covers the attachment portion in the end portion on the second end side of the electronic pen main body unit in the axial direction of the electronic pen main body unit,
wherein the cap case unit has a space portion configured to house the weight member attached to the attachment portion when the cap case unit is engaged with the second end side in the axial direction of the electronic pen main body unit,
wherein the attachment portion is provided with an elastic member configured to bias the weight member attached to the attachment portion to the second end side of the electronic pen main body unit in the axial direction of the electronic pen main body unit, and the weight member is configured not to move in the axial direction when the cap case unit is engaged with the second end side of the electronic pen main body unit in the axial
direction of the electronic pen main body unit, and
wherein the elastic member is formed by a coil spring, and
a first end of the coil spring, the first end being on a pen
tip side in a direction in which the coil spring elastically
extends or contracts, is fixed to the attachment portion
of the electronic pen main body unit.

2. The electronic pen according to claim 1, wherein:
a fitting portion configured to be fitted to the attachment
portion is formed in the weight member, and
the fitting portion includes a fitting portion-diameter por-
tion smaller than an inside diameter of the coil spring,
the fitting portion-diameter portion being on an end
side of an outside diameter portion larger than the
inside diameter of the coil spring.

3. The electronic pen according to claim 1, wherein:
the weight member is configured to change a gravity
center position in the axial direction of the electronic
pen main body unit to the second end side in the axial
direction of the electronic pen main body unit.

4. The electronic pen according to claim 1, wherein:
the weight member is configured to change a weight of the
weight member, and to change a gravity center position
in the axial direction of the electronic pen main body
unit to the second end side of the electronic pen main
body unit in the axial direction of the electronic pen
main body unit.

*   *   *   *   *